United States Patent [19]

Martin et al.

[11] Patent Number: 5,272,638
[45] Date of Patent: Dec. 21, 1993

[54] SYSTEMS AND METHODS FOR PLANNING THE SCHEDULING TRAVEL ROUTES

[75] Inventors: Cynthia C. Martin, Richardson; Philip R. Thrift; Marion C. Lineberry, both of Dallas, all of Tex.

[73] Assignee: Texas Instruments Incorporated, Dallas, Tex.

[21] Appl. No.: 709,926

[22] Filed: May 31, 1991

[51] Int. Cl.$^5$ .............................. G06F 15/50
[52] U.S. Cl. .................... 364/444; 364/449; 340/990; 340/995
[58] Field of Search .......... 364/443, 444, 449, 424.02; 73/178 R; 340/988, 990, 995

[56] References Cited

U.S. PATENT DOCUMENTS

| | | | |
|---|---|---|---|
| 4,570,227 | 2/1986 | Tachi et al. | 364/444 |
| 4,796,189 | 1/1989 | Nakayama et al. | 364/444 |
| 4,926,336 | 5/1990 | Yamada | 364/449 |
| 4,937,753 | 6/1990 | Yamada | 364/449 |
| 4,962,458 | 10/1990 | Verstraete | 364/444 |
| 4,984,168 | 1/1991 | Neukrichner et al. | 364/449 |
| 5,031,104 | 7/1991 | Ikeda et al. | 364/449 |
| 5,036,471 | 7/1991 | Tamura et al. | 364/449 |
| 5,038,290 | 8/1991 | Minami | 364/424.02 |
| 5,041,983 | 8/1991 | Nakahara et al. | 364/449 |

*Primary Examiner*—Gary Chin
*Attorney, Agent, or Firm*—W. Daniel Swayze, Jr.; Richard L. Donaldson; Leo N. Heiting

[57] ABSTRACT

A method is provided for using a computer to select a travel route based on a selected performance criteria from a plurality of possible travel routes connecting a plurality of destinations. Information is input describing the location of each destination to be visited. For each pair of destinations, a connecting path having an optimum performance value based on the selected performance criteria is determined. An array of randomly ordered sequences is created with each sequence representing a unique ordering of the destinations to be visited. For each sequence, the optimum performance values for each connecting path of each pair of destinations are summed to obtain a total performance value for the routes described by the sequence. A genetic cellular automaton is iteratively applied to the array to determine the travel route having the selected performance criteria by computing a near optimum sequence of destinations.

22 Claims, 3 Drawing Sheets

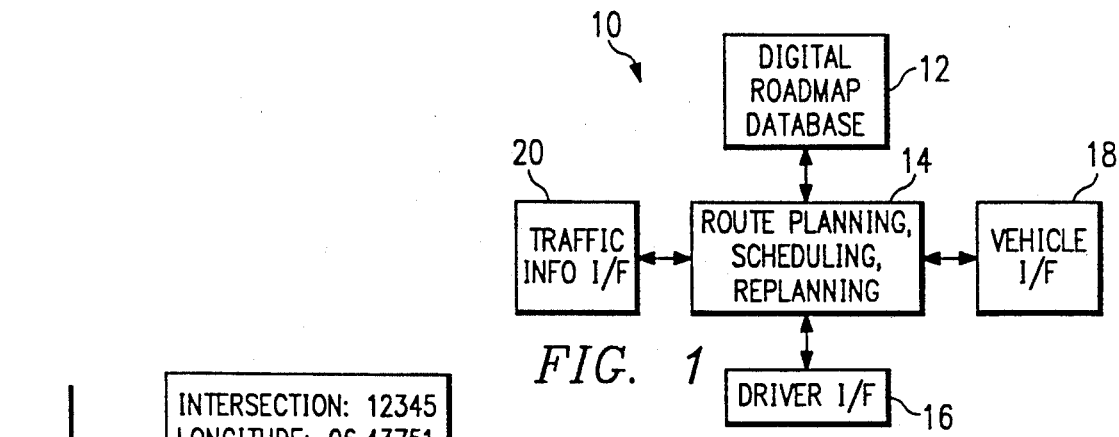

FIG. 1

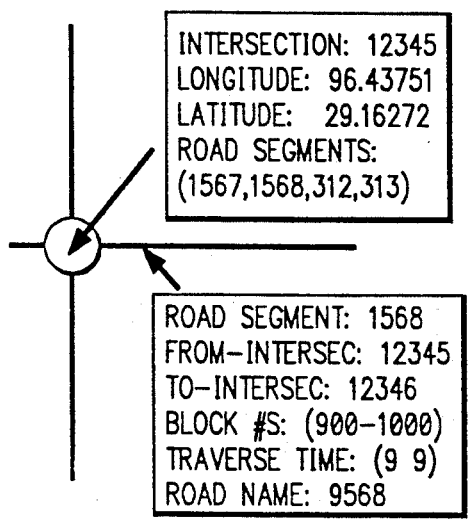

| INSTRUCTIONS WINDOW |
|---|
| GO WEST ON LAZY MEADOWS DR |
| TRAVEL 0.12 MILES THEN TURN RIGHT AT GOLDEN SUNSHINE DR |
| TRAVEL 0.35 MILES THEN TURN LEFT AT HARVEST BEND BLVD |
| TRAVEL 0.16 MILES THEN TURN LEFT AT WINDFERN ROAD |
| TRAVEL 0.66 MILES THEN TURN LEFT AT FM 1960 |
| TRAVEL 0.07 MILES THEN TURN RIGHT AT JONES ROAD |
| TRAVEL 0.55 MILES THEN TURN LEFT AT TALL TIMBER DR |
| TRAVEL 0.41 MILES THEN TURN RIGHT AT OAK VALLEY DR |
| TRAVEL 0.35 MILES THEN TURN LEFT AT MILE DR |
| TRAVEL 1.26 MILES THEN TURN RIGHT AT CYPRESS-NORTH HOUSTON ROAD |
| TRAVEL 0.11 MILES THEN TURN LEFT AT FLANNAGAN |
| TRAVEL 0.18 MILES TO DESTINATION |
|    TOTAL TRAVEL TIME IS 9.10 MINUTES |
|    TOTAL DISTANCE TRAVELED IS 4.21 MILES |

# SYSTEMS AND METHODS FOR PLANNING THE SCHEDULING TRAVEL ROUTES

TECHNICAL FIELD OF THE INVENTION

The present invention relates in general to computer systems and in particular to systems and methods for planning and scheduling travel routes.

BACKGROUND OF THE INVENTION

Significant efforts are currently underway to develop in-vehicle driver information systems which will allow a driver to efficiently plan and execute his or her travel routes. In addition to providing for the preplanning of travel routes, efforts are being made to develop systems which will account for changing road conditions, such as accidents and other road obstacles. One approach has been to broadcast traffic information to individual vehicles. Associated in-vehicle display and navigation systems display the received information and locate the driver on a map. Other approaches used in in-vehicle driver information systems have included navigation systems based on dead reckoning and satellite information.

The development of driver information systems having route scheduling and planning functions hereto have been limited by the inability of systems designers to capture and organize the large amounts of data associated with roadmaps. It is through the use of these roadmaps that the designers can develop "intelligent driver" technologies providing integrated navigation, route planning, and driver information at a reasonable cost in both commercial and private applications. Most significantly, prior art systems have been unable to provide scheduling functions such that multiple stop trips can be optimized as to time and distance. Drivers would benefit by an in-vehicle information system providing route planning and replanning capabilities through the ability to select the most convenient route and the ability to easily travel to unfamiliar destinations. Commercial delivery companies would benefit from better route scheduling and the consequent reduction in travel time and driver costs.

Thus, the need has arisen for an in-vehicle driver information system having the capability to efficiently plan and schedule travel routes, including multiple stop routes, based on a roadmap database using minimal memory resource. Further, the system should allow for the replanning and rescheduling of the travel routes based on changing road conditions, such as the occurrence of accidents.

SUMMARY OF THE INVENTION

According to the invention, a method is provided for using a computer to determine a travel route based on a selected performance criteria from a plurality of possible travel routes connecting a plurality of destinations. Information is input describing the location of each destination to be visited and for each pair of destinations, a performance value for a connecting path therebetween is determined based on the selected performance criteria. An array of randomly ordered sequences is created with each sequence representing a unique ordering of the destinations to be visited. For each sequence, the performance values for each connecting path of each pair of destinations are summed in order to obtain a total performance value for the route described by the sequence. A genetic cellular automaton is iteratively applied to the array using the total performance value as a fitness function.

The present invention provides significant advantages over prior in-vehicle driver information systems. The present invention is able to both plan and schedule travel routes based on a roadmap database. The present system efficiently captures and organizes the large amount of data associated with the roadmap database using minimal memory space. The system also allows for the replanning and rescheduling of the travel routes based on changing road conditions, such as the occurrence of accidents. Finally, the present system calculates the most efficient sequence of stops on a multiple stop route such that the driver can maximize the overall efficiency of his or her trip.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a functional block diagram of an in-vehicle travel route planning and scheduling system;

FIG. 2 is an illustration of a preferred roadmap data structure used in association with the present invention;

FIG. 4 depicts a possible written output format for use in association with the present invention.

DETAILED DESCRIPTION OF THE INVENTION

Figure 3A:
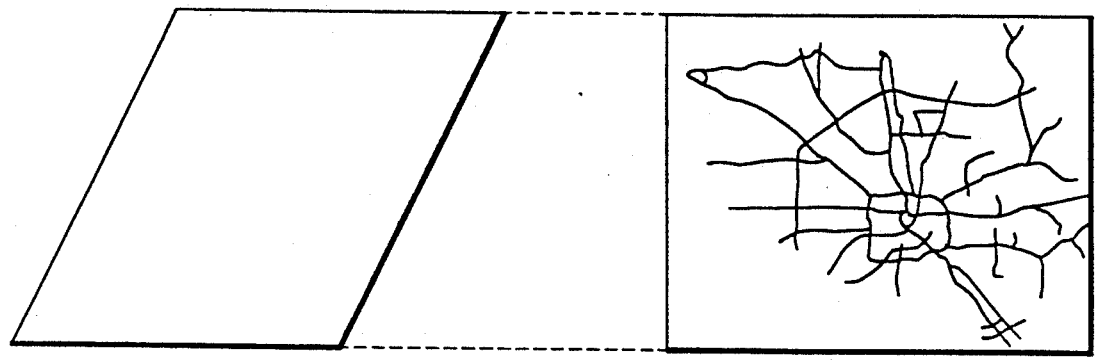
FIG. 3a-c depict the quad partitioning of roadmap data.

Referring first to FIG. 1, a functional block diagram depicts a computer system 10 operable to plan and schedule travel routes using a digital roadmap database. The primary system components include memory 12, containing a digital roadmap database, and a processor 14 having route planning, scheduling and replanning capabilities. The route planning and replanning capabilities help a driver traveling to a specific destination by determining a minimum travel time route and by providing turning direction, mileage and estimated driving time data. The route scheduling capability helps reduce the total travel time in multiple stop trips by providing a substantially optimal ordering of the stops. Computer system 10 also includes a driver interface 16 for allowing the exchange of information between the processing system 14 and the vehicle driver. Vehicle interface 18 and traffic interface 20 allow for the input of roadway and vehicle information which is analyzed in the context of the currently driven route such that decisions can be made concerning that route based upon updated driving conditions.

THE ROADMAP DATABASE

The roadmap database 12 supports three major functions: (1) address and location specification (driver input); (2) direction and driver information display (driver output); and (3) the EXECUTION of route planning and scheduling methods. An example of a suitable roadmap database is the TIGER database generated by the Census Bureau for use in the 1990 Census. The TIGER files, which are organized by county, store one line of data for each road segment in each county in the United States. The most important information about each road segment are the segment endpoints known as intersections, defined in terms of longitude and latitude pairs, the name of the road and the address block numbers along the segment.

Due to the size and complexity of the roadmap database, a large amount of memory storage space would normally be required. For a vehicle portable system, such memory may not be readily available; thus, a reduction in the amount of required system memory is advantageous. Therefore, in the preferred embodiment, to avoid redundant storage of latitude and longitude pairs, a list of unique intersection data structures is created. Similarly, a list of unique road name data structures is also created. Intersection and road name information is replaced in each road segment data structure with pointers to its respective intersection and road name data structure. An example of a preferred format for the road segment, intersection, and road name data structures, is depicted in FIG. 2. When creating the intersection data structure, a list of all the road segments that meet at that intersection is also stored. So that road segment can be accessed by name when the driver specifies an address, road name data structures also have pointers back to the road segments having that name. By structuring the road map data base 12 in this fashion, a 2-1 reduction in storage for road segment and points and a 5-1 reduction in name strings, is achievable.

Accurate route planning requires information about speed limits, one-way streets, traffic control signals, and typical traffic congestion patterns. In the preferred embodiment, this information is expressed in terms of the time required to traverse a road segment. For example, the major roads and freeways can be specified in the database such that the traversal times for the individual road segments can be computed. One-way streets can be specified in terms of a finite traversal time for the proper direction and an infinite traversal time for the opposite direction. Temporary changes to traversal times, due to such factors as time of day, accidents, and road construction, are recorded separately so that the original times can be restored when conditions return to normal.

Figure 3B:
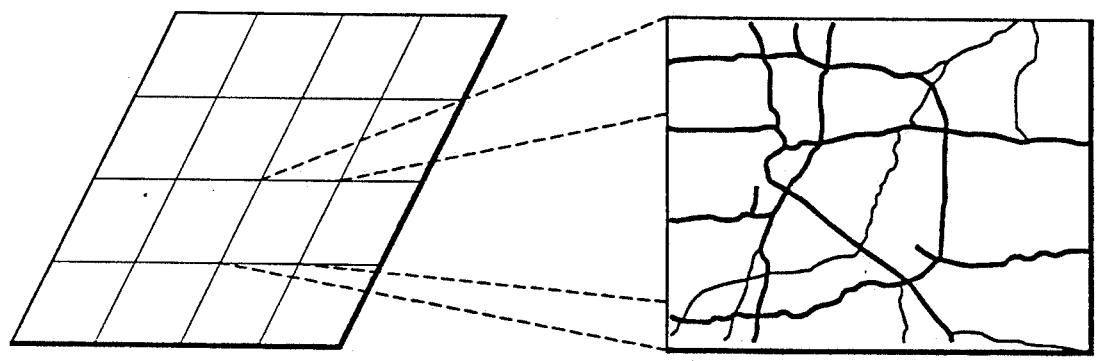
Figure 3C:
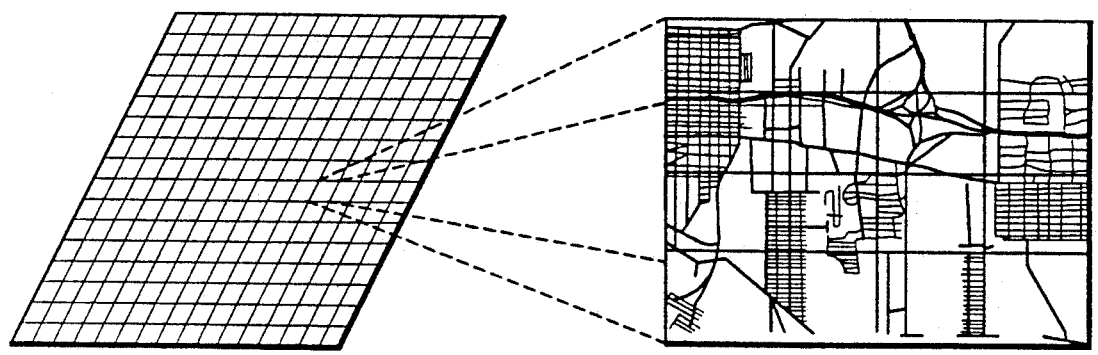

In the preferred embodiment, partitioning is employed to effectively manage the dynamic storage requirements of the route planning function. The most efficient route planning functions require n-log (n) operations, where n is the number of intersections in the roadmap network. By partitioning the intersection list into a quad tree format, the value for n can be kept at a small fraction of the total number of the intersections in the database. In the preferred embodiment, a three-level quad tree of i, 16, and 256 quadrants is used as depicted in FIG. 3. The single quadrant at the top of the tree includes a list of pointers to all freeway intersections in the roadmap. The second level includes sixteen lists of intersections involving major roads grouped by an evenly spaced 4×4 rectangular grid placed over the first level quadrant. Similarly, the third level includes the minor roads grouped by a 16×16 grid over the first level quadrant. The quad trees are used such that the only roads considered when planning a route are: (1) neighborhood roads in the immediate vicinity of the start and destination locations; (2) major thoroughfares for short trips; and (3) freeways for long trips.

DRIVER INTERFACE

Driver interface 16 provides the primary functions of allowing the driver access to roadmap information, facilitating driver input, and formatting directional output for the driver. In the preferred embodiment, driver interface 16 includes a display system which maintains an index of icons used to designate predefined locations or addresses, such as, airports, hospitals, and hotels. The roadmap information may be represented by a graphical interface so that roadmaps may be displayed as collections of individual line segments. A zooming function allows the driver to view varying levels of road detail, from a high level view of freeways in a metropolitan area to a detailed view of neighborhood streets. For easier viewing, freeways and major roads may be distinguished from neighborhood streets by color and increased line thickness.

For both route planning and scheduling applications, the driver initiates the process by the input a start location and a final destination. Further, in scheduling applications, it may be necessary for the driver to input intermediate destination points, either ordered or unordered. Therefore, in the preferred embodiment, the user interface is flexible allowing the driver to make location selections in any of a number ways. For example, driver interface 16 may allow the driver to make location selections by specifying an address, designating an intersection on a map (this function may can be implemented, for example, with a touch screen capability), or by picking from a set of predefined locations represented by icons. In the preferred embodiment, driver interface 16 includes an alphanumeric keypad for driver input into computer system 10. An address completion function is incorporated into processor 14 which guarantees that only valid block address numbers and street names can be entered.

The directional information presented by driver interface 16 may take varying forms based upon both driver preference and the type of directions required. For example, the driver can receive directions in either typewritten form, graphically or audibly. FIG. 4 depicts an example of displayed typewritten instructions giving detailed instructions about the length of travel along each road, at which intersection to make the next turn, and the total estimated travel time. Graphical directions may be displayed in the form of highlighted road segments or as a simulation of the movement of the vehicle along the planned route. Audible instructions may, for example, use digitally recorded speech to give turning directions and street names.

VEHICLE AND ROADWAY INFORMATION

In the preferred embodiment, vehicle interface 18 includes a navigation system which tracks the vehicle's location and direction of travel. Location,, for example, can be represented by either global coordinates or by street segments. From the input from the vehicle interface 18, a determination can be made when the vehicle is approaching a planned turn, such that turn information (street name and direction) can then be verbally and/or graphically displayed to the driver through driver interface 16.

Traffic information interface 20 allows for the automatic input of dynamic information, such as constantly changing information relating to traffic conditions along the desired route. Traffic interface 20, for example, may receive digital broadcasts over radio sidebands or from centralized cellular phone systems containing information about traffic obstacles such as accidents and the amount of resulting delay over the roads effected by the obstacle. Computer system 10 can then use the input of this information to determine if the obstacle lies along the currently planned route, and if so, the route planning function may be automatically rerun using the updated traffic information.

Processor 14 uses two different optimization procedures to implement the respective planning and scheduling functions of computer system 10. The route planning function is based on Dijkstra's shortest path search and determines the shortest path between two points based on travel constraints or "performance criteria."- The scheduling function generates a near optimal ordering of multiple stops for a given set of destinations.

ROUTE PLANNING

In the illustrated embodiment, the route plan is based on the path having the shortest travel time between the starting and final location, however, other performance criteria may be selected in alternative embodiments. For example, the vehicle driver may wish to select a travel route having the shortest distance between the starting and finishing locations, or one in which both time and distance are taken in combination to optimize the route, or even one in which the type of road travelled is substantially the same along the route (i.e., all freeways, or all surface streets.) While the performance criteria may change, the method structure is the same as in the illustrated embodiment.

The purpose of the route planning function is to determine the optimal path between a starting location and the final destination based on driver selected performance criteria. In the preferred embodiment, this function of computer system 10 is implemented in processor 14 by the application of Dijkstra's shortest path algorithm. Using a "best-first" search approach in a weighted graph configuration, the algorithm finds a path connecting two given nodes x and y such that the sum of the weights of all the segments is minimized over the path. In the route example planning application, the weighting constraint or performance value on each segment is the travel time between the two given nodes. In alternate embodiments other performance values (weighting constraints) may be associated with the selected performance criteria. For example, distance between nodes may be used in place of travel time. In embodiments such as those in which use type of roadway is the performance criteria, the performance value (weighting constraint) would comprise priority values assigned to the various roadway types making up the possible routes between pairs of nodes. As a node is visited, the travel times of all the previous edges on the path are summed, and the "accumulated time" is then associated with that node. Each visited node is stored on a list in descending order of the accumulated travel time to that node, thereby, leaving the node with the smallest travel time the node to be evaluated next at all times. A node may be evaluated multiple times because there may be more than one unique path that leads to it, but only the node value with the lowest time remains on final path list. Additionally, the previously visited node on the path, known as the from-node, is also stored along with each node so that a path can be reconstructed in linked-list fashion once the "goal" (destination) node is retrieved from the list.

Figure 5:
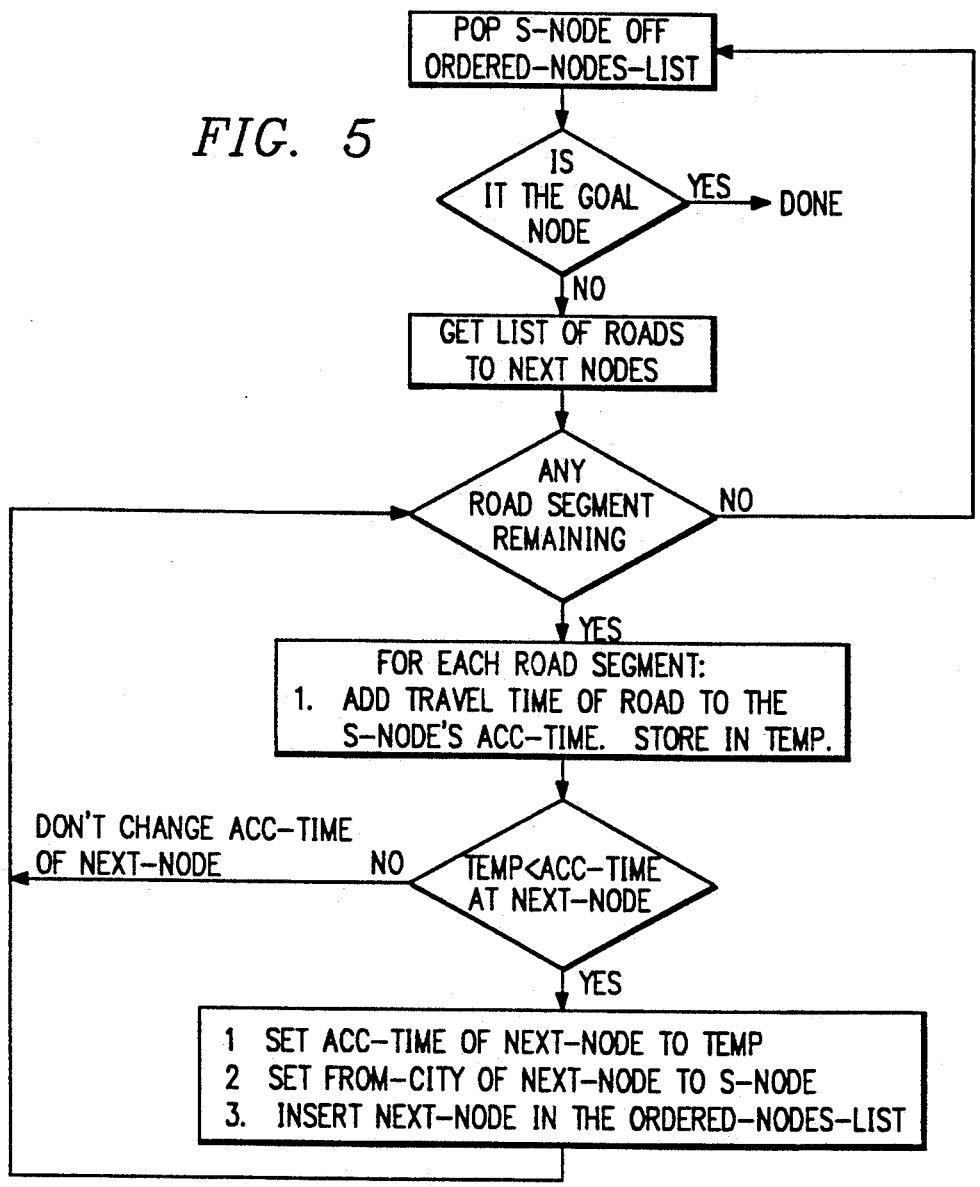
FIG. 5 depicts a flow chart describing the method of route planning according to the preferred embodiment of the present invention.

FIG. 5 depicts a flow chart of the route planning function. For the start node X and the goal node y, the best-first search starts at X and visits all nodes that can be reached from X with one edge. Based on the node with the lowest accumulated time (the first node on the list). The search iteratively visits all nodes connected to the node with the lowest accumulated time until the goal node becomes the node with the lowest accumulated time, i.e., when the goal node is retrieved from the list.

Figure 6:
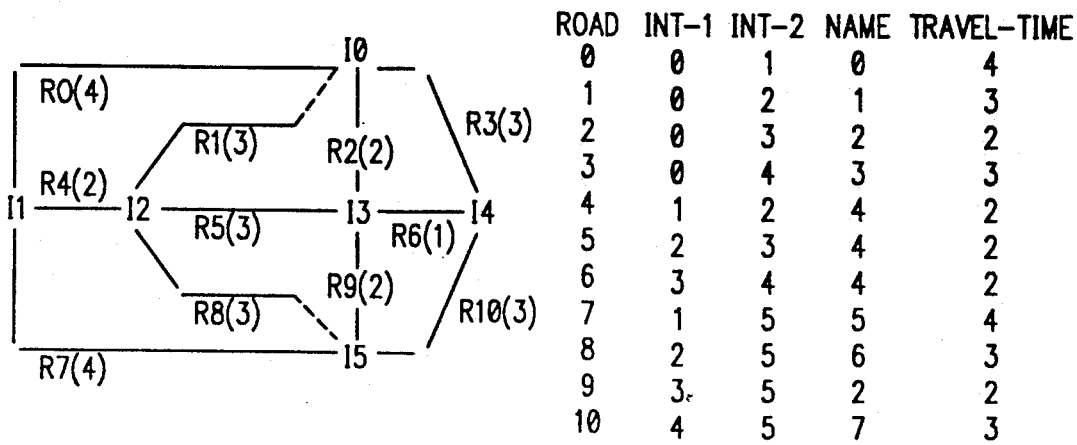
FIG. 6 is an example of a typical map containing road segments and intersections and a corresponding table indicating the road segment name, the intersections bounding the segment and the travel time between the intersections.

In the route planning application, nodes are equivalent to road intersections and edges connecting the nodes of the graph are road segments. FIG. 6 depicts an example of a map containing road segments and intersections. The corresponding table indicates the road segment name, the intersections bounding that segment, and the travel time between the two intersections. To run the route planning algorithm, each intersection is initialized where the from-intersection value (used for reconstructing the final route, explained below) is set to NIL (meaning yet unassigned in determining the final route) and the accumulated time to a value MAXNUM, where the MAXNUM value is selected such that it guarantees that when an intersection is first visited during route planning, accumulated path time assigned to this intersection will be the lowest value associated with the node.

The route planning algorithm can best be explained by an example demonstrating the determination of the shortest path from an intersection 1 (11) to an intersection 4 (14). The intersection at the opposite end of the road segment from the starting intersection will be designated as the "next-intersection". To begin, the from-intersection value of intersection 1 is set to the constant START (used when reconstructing the path to indicate the starting intersection) and the accumulated time to get to the starting intersection is set to 0 (since there is no previous path to this point). The ordered intersection list is initialized to (1) for intersection 1. The first iteration of the algorithm then proceeds as follows:

1. The initial intersection (in this case intersection 1) is retrieved from the ordered-intersection list. If the retrieved intersection is the destination intersection, in this case intersection 4, the process is stopped, otherwise the processing continues.

2. The next-intersection from the list of road segments is retrieved. The travel time corresponding to this road segment is added to the accumulated time of the previous intersection, in the first iteration intersection 1, and the value is then stored in memory as TEMP.

3. If the value stored in TEMP is less than the accumulated time of the next-intersection, the accumulated time is adjusted to equal the value of TEMP, the from-intersection to be the existing intersection, and the next-intersection is inserted in the visited-intersection's list, otherwise the intersection values are left as is.

4. Iterate for each remaining road segment leading from intersection 1, namely road segments 0, 4 and 7.

For the given example, as expected on the first iteration, the value in TEMP is less than MAXNUM for every next-intersection so at the end of the first iteration, the results are as follows:

The visited intersections list: (2 0 5)

| Intersection | Minimum-Time | From-Intersection |
|---|---|---|
| 0 | 4 | 1 |
| 1 | 0 | START |
| 2 | 2 | 1 |
| 3 | MAXNUM | NIL |
| 4 | MAXNUM | NIL |
| 5 | 4 | 1 |

The next iteration starts with intersection 2 since it is at the head (lowest accumulated path time) of the ordered-intersections-list. Continuing the processing as indicated in the flow chart of FIG. 5, lead to the results for the second iteration:

Ordered-intersections-list: (0 5 3)

| Intersection | Minimum-Time | From-Intersection |
|---|---|---|
| 0 | 4 | 1 |
| 1 | 0 | :START |
| 2 | 2 | 1 |
| 3 | 5 | 2 |
| 4 | MAXNUM | NIL |
| 5 | 4 | 1 |

The iterative application of the algorithm shown in the flow chart of FIG. 5 continues until the destination intersection 4 has been retrieved from the order intersection list. Once intersection 4 has been retrieved, the path is reconstructed from the from-intersection pointers leading back to the START intersection.

Information received through traffic information interface 30 can be used for the dynamic replanning of the travel route in response to changes in road conditions. For example, if a driver is proceeding along a planned route and is notified of traffic congestion, through traffic information interface 30, the computer system 10 is operable to determine if the obstacle is located on the route that is being traversed and if so, automatically replan the travel route through an additional "next-best" calculation. As discussed above in regard to the database section, the changes in travel conditions are represented in the database by modifying the existing traversal times of the road segments which maintains data consistency, thus allowing the planning algorithm to be used repeatedly without software change. The modifications in traversal times can subsequently be easily reverted back to their original states when the travel conditions return to normal simply by reinserting the original calculated values.

ROUTE SCHEDULING

The route scheduling scenario is better known in the art as the traveling salesman problem. This problem can be classified in two ways, first, as an NP-complete problem, whose computation time for the optimal solution increases with N1, and second, as a minimization problem for which the incremental solution is derived from local minima. In the preferred embodiment, the second classification is used as a starting point for generating near-optimal solutions for the scheduling problem.

In the preferred embodiment, the route scheduling function is implemented using an optimization: procedure based on an extension of the cellular automaton model. A cellular automaton is defined as a uniform network of interconnected, identical cells in an n-dimensional space, in the present embodiment a vector array. The characteristic feature of a cellular automaton is its evolution rule which specifies how a new state of a cell is determined based on the current states of its neighboring cells. The state of a cell is an element of some state space S, in the present invention permutations of a set of integers $[1, \ldots, k]$. A genetic cellular automaton is a cellular automaton with the additional feature that each cell has a value v determined by its state sES and a fitness function f such that $v=f(s)$. The evolution rule for the genetic cellular automaton is based on the fitness function and a combination of genetic operators: replication, cross-over, and mutation. In the preferred embodiment of the present invention, the mutation operator is used to optimize the local minima.

An example of using a genetic cellular automaton is to minimize a function f over the given set S. In this case, let the neighborhood topology on a square grid of cells be the four neighbors horizontal and vertical to the chosen cell. The initial states on the cellular automaton are elements of S chosen at random. Using the mutation operator, the evolution rule at a cell c be as follows: if there is a cell in the neighborhood of c with a fitness better than that of c, and it is also the best in the neighborhood of c, then replace the state of c with the state of the neighbor cell, modified by flipping a small number of random bits. It is this approach that is applied to the multiple destination scheduling problem.

In the traveling sales person problem, a salesman visits n locations with given positions (xi, yi), returning to the location of origin. In the case of route scheduling according to the present embodiment, it is not necessary to return to the starting location at the end of a given route, however, the overall solution of the problem is similar. For an optimal solution, each location along the travel route is to be visited only once, while at the same time, the route is to be made as short as possible. In implementing this function, the scheduling algorithm generates an array of randomly ordered sequences of length n, where n is the number of points to be visited and each sequence represents one cell in the array. Each sequence, therefore, represents a unique route for the ordering of the stops. As an example, the ordering of stops along one sequence may be 1-2-4-5-3 where as the next ordering of stops may be 1-3-4-2-5. Using Dijkstra's shortest path algorithm in the illustrated embodiment, the optimized paths between each pair of destination points having the shortest travel time are calculated, for both the forward and reverse traveling directions, and stored in an n×n array. The travel times for the shortest paths between each pair of destination points in each sequence are then summed, in order, to obtain a total route travel time for the route described by each sequence. For example, using the 1-2-4-5-3 sequence, the sum of the path form destination 1-2 is added to the sum of the path from 2-4, and so on. The same method may be used when other performance criteria have been selected with the associated performance values optimized for each pair of destination points summed rather than the shortest travel times between pairs in the illustrated embodiment.

The comparison between sequences is then made using the genetic cellular automaton, described above in the illustrated embodiment, using the total route time calculated by summing up the travel times for the optimized paths between destinations as the fitness function. The sums of other performance values would provide the fitness function in alternate embodiments in a similar fashion. The genetic cellular automaton determines a near-optimal ordering of the destinations which when taken with the optimized paths connecting each pair of destinations as calculated using Dijkstra's shortest path algorithm, selects a near-optimal travel route having the shortest route travel time. The contents of a cell are replaced with a mutation of the neighbor with the next best fitness, in the present invention the smallest travel time of the route, if that neighbor has a better fitness value. The mutation operator is a random inversion, which is achieved by selecting two points of the permutation at random and inverting the sequence between them. An example would be 1437625→1432675. The process is iterated such that each cell is compared with its neighbors a number of times to assure optimization. The number of iterations is either explicitly preselected by the input of specific number in the software or hardware or implicitly preselected by a similar input of a overall time to complete the processing. Once completed, the algorithm returns a near optimal path based upon travel time. This route is then drawn on the map on the same manner as the original route only numbered to indicate the ordering of stops.

While preferred embodiments of the invention and their advantages have been set forth in the above-detailed description, the invention is not limited thereto, but only by the scope and spirit of the appended claims.

What is claimed is:

1. A method for using a computer to determine a travel route based on a selected performance criteria from a plurality of predetermined travel routes connecting a plurality of destinations, the method comprising the steps of:
   inputting information describing a location of each of said destinations to be visited;
   determining a connecting path for each pair of said destinations having an optimum performance value based on the selected performance criteria;
   creating an array of randomly ordered sequences, each of said randomly ordered sequences representing a unique travel route;
   summing each of said sequences in an order of the optimum performance values for at least one connecting path between each neighboring pair of said destinations in the sequence to obtain a total performance value for said unique travel route described by the sequence; and
   iteratively applying a genetic cellular automaton to the array to determine a travel route having the optimum performance value by computing an additional array of ordered sequences, each sequence representing said unique travel route.

2. The method of claim 1, wherein said iteratively applying step comprises the steps of:
   comparing each sequence in the array with neighboring sequences in the array based on the total performance value; and
   replacing the sequence being compared with a mutation of a neighboring sequence having the best total performance value, if the best total performance value among the neighboring sequences is better than the total performance value of the sequence being compared.

3. The method of claim 2, wherein said replacing step comprises the step of generating said mutation of the neighboring sequence using a random inversion.

4. The method of claim 3, wherein said generating step comprises the step of randomly selecting fit and second destinations in the neighboring sequence with the best total performance value and inverting the sequence between said first and second destinations.

5. The method of claim 1, wherein said step of determining a connecting path having an optimum performance value for each pair of destinations comprises the steps of:
   determining possible combinations of road segments comprising possible paths connecting the pair of destinations; and
   selecting the combination of road segments comprising the connecting path having said optimum performance value.

6. The method of claim 5, wherein said step of selecting comprises the step of applying Dijkstra's shortest path algorithm.

7. The method of claim 5, wherein said method further comprises the steps of:
   inputting information describing road conditions along the road segments comprising the plurality of paths connecting each pair of said destinations; and
   determining a performance value associated with said road segments and said road conditions in response to said step of inputting information.

8. A method for using a computer to select a travel route with a shortest travel time from a plurality of possible travel routes connecting a plurality of destinations, the possible travel routes corresponding to a roadmap database by a plurality of paths connecting each pair of said destinations, each of said paths represented by roadmap road segments having associated travel time, the method comprising the steps of:
   inputting information describing a location of each of said destinations to be visited;
   determining a near-optimal path between each pair of said destinations having the shortest travel time;
   creating an array of sequences, each of said sequences describing a unique travel route connecting the destinations;
   calculating an associated route travel time for each of said sequences in the array by summing in order the travel times o the near-optimal paths connecting each of a pair of said destinations and calculating a shortest route travel time from the associated route travel time; and
   selecting the ravel route having the shortest route travel time by optimizing the ordering of destinations by operating one the sequences in the array with a genetic cellular automaton.

9. The method of claim 8, wherein said step of selecting the travel route having the shortest travel time comprises the step of optimizing the ordering of the destinations by operating on the sequences in the array with said genetic cellular automaton using the associated route travel times of here sequences in the array as a fitness function.

10. The method of claim 9, wherein said step of selecting comprises the step of optimizing the ordering of the destinations by suing the fitness function and a mutation operator.

11. The method of claim 8, wherein said step of creating an array of sequences comprises the step of creating an array of randomly selected sequences.

12. The method of claim 8, wherein said step of determining a near-optimal path between each pair of said destinations comprises the step of:
   determining possible combinations of road segments connecting each of said pair of said destinations; and applying Dikstra's shortest path algorithm for each of said pair of said destinations to the possible combinations of said road segments connecting the pair of destinations using road segment travel times as a weighting constraint.

13. The method of claim 8, wherein said step of selecting the ravel route with the shortest route travel time by operating on the sequences in the array with said genetic cellular automaton comprises the step of:
   comparing each of said sequences in the array with neighboring sequences in the array based on route travel time;
   replacing the compared sequences with a mutation of a neighboring sequence having the shortest route travel time, if the shortest route travel time among the neighboring sequences is shorter than the route travel time of the compared sequence; and
   wherein the mutation of the neighboring sequence with the shortest route travel time is implemented by inverting the sequence between randomly selected first and second destinations in the neighboring sequence.

14. The method of claim 8, wherein said method further comprises the steps of:
   inputting information corresponding to road conditions along the roadmap road segments comprising the plurality of paths connecting each of the pair of said destinations; and
   determining the associated travel time for each segment in response to said step of inputting information.

15. The method of claim 14, wherein said method further comprises the step of:
   repeating the step of determining the near optimal path for each of the pair of said destinations and repeating the step of selecting the travel route having the shortest travel time in response to the input information describing changed road conditions following an initial selection of the travel route haven the shortest travel time.

16. A route scheduling computer comprising:
   a memory including a roadmap database, said roadmap database defining a plurality of road segments connecting a plurality of possible destinations;
   circuitry for inputting information describing selected ones of said plurality of said possible destinations to be visited; and
   a processor for selecting a travel route having a shortest route travel time connecting said destinations to be visited, said processor operable to:
   select a combination of said road segments forming a path connecting said destinations for each of said destinations to be visited, said path having shortest path travel time between a pair of said destinations;
   create an array of randomly ordered sequences, each of said sequences corresponding to a unique order of said destinations to be visited;
   sum in order of said shortest path travel time for said sequences and to determine a route travel time associated with each of said sequences; and
   select an order of said destinations to be visited representing said travel route having said shortest route travel time by a genetic cellular operator to said sequences in said array, said generic cellular operator using said determined route travel time as a fitness function.

17. The computer of claim 16, wherein said processor is operable to select said combination of said road segments forming said path having said shortest path travel time by applying Dijkstra's shortest path algorithm to combinations of said road segments comprising possible paths between said pair of said destinations.

18. The computer of claim 17, wherein said computer is operable to apply said Dijkstra's shortest path algorithm using a travel time associated with each of said road segments in said roadmap database.

19. The computer of claim 18, wherein said computer further comprises circuitry for inputting information corresponding to road conditions along said road segments, and wherein said processor is further operable to determine said ravel time associated with each of said road segments in said road map database in response to receipt of said information corresponding to said road conditions along said road segments.

20. The computer of claim 16, wherein said processor is further operable to organize said roadmap database in said memory in a quad tree format.

21. The computer of claim 19, wherein said processor is further operable to repeat said selection of said combination of road segments forming said path having said shortest path travel time and to repeat said selection of said ordering of said destinations representing said travel route having said shortest route travel time upon the receipt of information including changed road conditions after an initial selection of said travel route having said shortest travel time.

22. A route scheduling computer comprising:
   a memory including a roadmap database, said roadmap database defining a plurality of road segments connecting a plurality of possible destinations;
   circuitry for inputting information corresponding to selected ones of said plurality of road possible destinations to be visited; and
   a processor for selecting a travel route having an optimum performance value and connecting said destinations to be visited, said processor operable to:
   input information corresponding to a location of each of said destinations to be visited;
   determine a connecting path for each pair of said destinations and between said destinations having the optimum performance value based on a selected performance criteria;
   create an array of randomly ordered sequences, each of said sequences representing a unique travel route;
   sum for each sequence and in order of the optimum performance values for each of said connecting path of each of said pair of said destinations to obtain a total performance value for said unique travel route; and
   iteratively apply a genetic cellular automaton to the array to determine the ravel route having the selected optimal performance criteria by computing a new optimum sequence o the destinations.

* * * * *